(No Model.)
W. NUSSBECK.
BEER COOLING APPARATUS.
No. 276,870. Patented May 1, 1883.
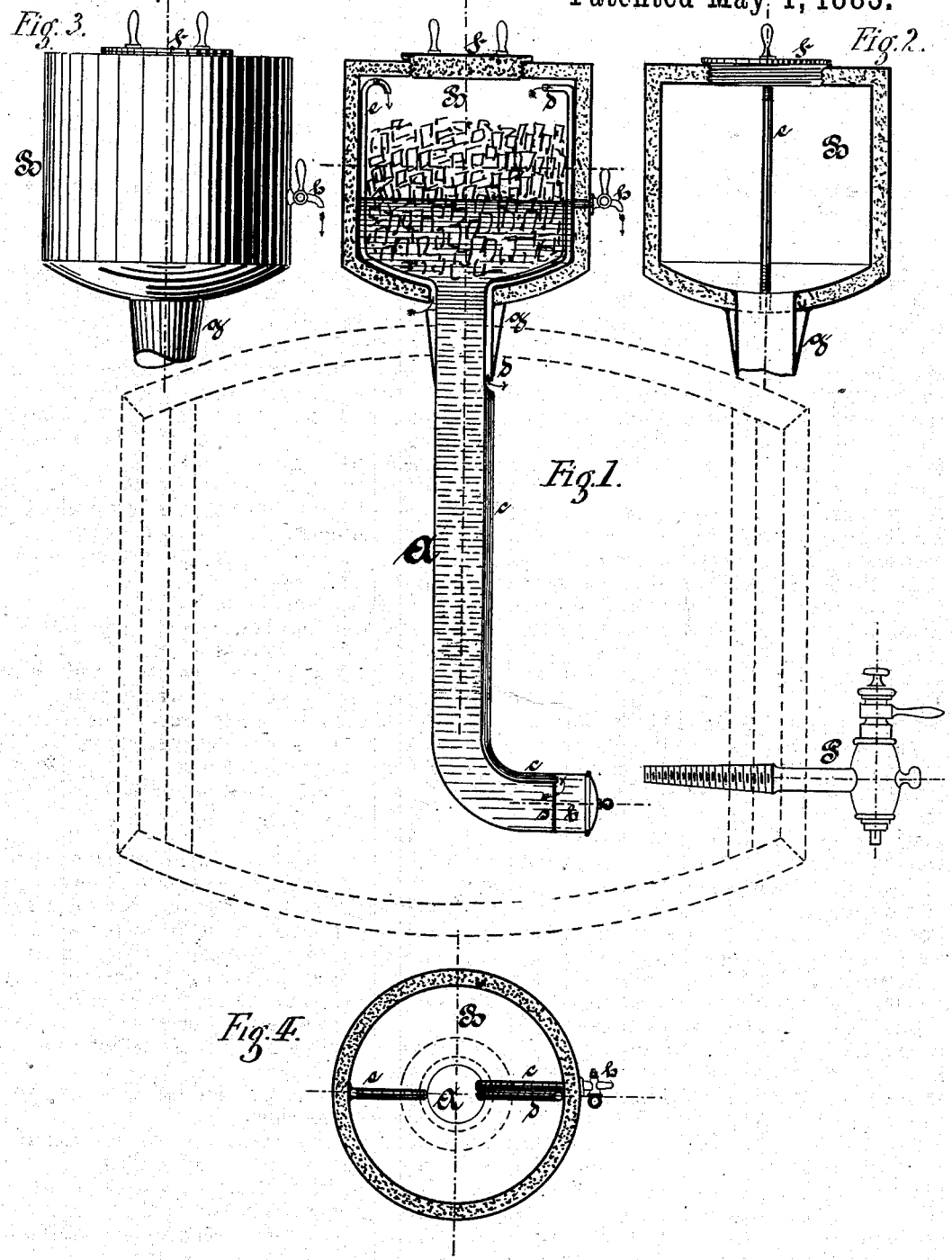

UNITED STATES PATENT OFFICE.

WILHELM NUSSBECK, OF BERLIN, GERMANY.

BEER-COOLING APPARATUS.

SPECIFICATION forming part of Letters Patent No. 276,870, dated May 1, 1883.

Application filed February 19, 1883. (No model.) Patented in Germany September 15, 1882, No. 766.

*To all whom it may concern:*

Be it known that I, WILHELM NUSSBECK, a subject of the Kingdom of Prussia, German Empire, residing at the city of Berlin, Prussia, have invented a new and useful Beer-Cooling Apparatus, (for which to obtain Letters Patent I made application to the German Government under No. 776 and date of September 14, 1882,) of which the following is a specification.

My apparatus for cooling beer in casks has for its object to cool the beer in the most direct manner, and at the same time to cool the atmospheric air which enters the cask.

In the accompanying drawings, which illustrate the invention, Figure 1 is a vertical section of a beer-cooler, showing its application to a cask. Fig. 2 is a vertical cross-section, Fig. 3 an elevation, and Fig. 4 a horizontal section, of the upper part of the apparatus.

The apparatus consists principally of the cooling-pipe A and the ice-reservoir B. The ice-reservoir B is composed of an exterior and an interior casing, both made of any suitable material, and the empty space formed between the two casings is filled with a bad conductor of heat—coal-dust, ashes, &c. Into the top of this double casing is screwed air-tight the double cover $f$, which cover is also filled with a bad conductor of heat.

Connected with the bottom of the ice-reservoir is the cooling-pipe A, surrounded by the conical jacket $g$, which at the same time forms a plug for the cask. In the interior of the ice-reservoir is situated the air-pipe $e$, which may be bent or corrugated, leading upward along the walls of the reservoir. This pipe communicates with the atmospheric air at the bottom of the reservoir, and has its mouth immediately underneath the top of the same, as shown in Fig. 1. Before entering the ice-reservoir the air is cooled in this pipe by means of the ice which surrounds the latter.

Situated in the interior of the ice-reservoir is a second air-pipe, $d$, also having its mouth underneath the cover, and discharging the cooled air immediately underneath the plug $g$ into the cask, over the level of the beer, as shown in Fig. 1, through the opening $d$. A third pipe, $c$, being a discharge-pipe for the water, leads from the chamber $b$ upward through the interior of the ice-reservoir B and discharges the waste cooling-water in proportion to the melting of the ice through cock $h$.

The cooling-pipe A is a metal pipe bent at a right angle and forming at its lower end the space $b$ by means of the sieve. Upward from the space $b$ and inside the pipe A leads the water-discharge pipe $c$.

The sieve $s$ is for the purpose of preventing impurities from ice-water entering the pipe $c$. The cooling-pipe A is closed at its bent end with a cap, which may be removed when the apparatus is cleaned.

P is the beer-cock.

The whole apparatus is constructed and made in such dimensions as to be easily handled—that is to say, filled, emptied, and cleaned. When the apparatus is removed the cock $h$ should be turned off to protect the person who handles the same from becoming wet. The jacket $g$ is surrounded with an india-rubber ring for the purpose of hermetically closing the bung-hole.

What I claim is—

1. A beer-cooling apparatus comprising in its construction an ice-reservoir, a cooling-pipe leading from the reservoir into the cask and nearly to the bottom of the latter, and an air-passage leading atmospheric air into an ice-reservoir and delivering it into the air-space of the cask, substantially as described.

2. The combination of an ice-reservoir, B, with a cooling-pipe, A, an outlet-pipe, $c$, for waste water, an air-inlet pipe, $e$, and an air-outlet pipe, $d$, substantially as and for the purposes described.

3. The combination of ice-reservoir B, provided with a cover, cooling-pipe A, water-chamber $b$, provided with a sieve, waste-water pipe $c$, provided with a tap, air-inlet pipe $e$, air-outlet pipe $d$, and jacket $g$, substantially as and for the purposes described.

In testimony that I claim the foregoing as my own I have hereunto set my name in the presence of two witnesses.

WILHELM NUSSBECK.

Witnesses:
B. ROI,
A. KUHNT.